United States Patent [19]

Price

[11] Patent Number: 5,451,939
[45] Date of Patent: Sep. 19, 1995

[54] MICROPROCESSOR CONTROLLED TRANSMITTER FOR CONNECTION TO A SENSOR AND A METHOD OF TRANSFERRING DIGITAL SIGNALS TO THE MICROPROCESSOR

[75] Inventor: Timothy D. Price, West Sussex, United Kingdom

[73] Assignee: Fisher-Rosemount Limited, United Kingdom

[21] Appl. No.: 974,582
[22] PCT Filed: Aug. 19, 1991
[86] PCT No.: PCT/GB91/01406
§ 371 Date: Mar. 29, 1993
§ 102(e) Date: Mar. 29, 1993
[87] PCT Pub. No.: WO92/03705
PCT Pub. Date: Mar. 5, 1992

[30] Foreign Application Priority Data

Aug. 20, 1990 [GB] United Kingdom ............... 9018232

[51] Int. Cl.6 .............................................. G08C 19/06
[52] U.S. Cl. .......................... 340/870.31; 340/825.54; 340/825.72
[58] Field of Search ................. 340/870.02, 870.31, 340/825.22, 825.50, 825.54, 825.69, 825.72, 539

[56] References Cited

U.S. PATENT DOCUMENTS

| | | | |
|---|---|---|---|
| 4,072,930 | 2/1978 | Lucero et al. | 742/825.54 |
| 4,158,185 | 6/1979 | Abe | 340/870.31 |
| 4,459,590 | 7/1984 | Sanluier | 340/825.54 |
| 4,608,564 | 8/1986 | Hoffman | 340/870.02 |
| 4,758,836 | 7/1988 | Sciulli | 340/870.02 |
| 4,801,924 | 1/1989 | Burgmann et al. | 340/539 |
| 4,824,378 | 4/1989 | Betz | 439/55 |
| 5,077,547 | 12/1991 | Burgmann | 340/825.72 |

FOREIGN PATENT DOCUMENTS

| | | |
|---|---|---|
| 3318977A1 | 5/1983 | Germany . |
| 3715199A1 | 5/1987 | Germany . |
| 2183342 | 6/1987 | United Kingdom . |
| 2191026 | 12/1987 | United Kingdom . |
| 9018232 | 9/1990 | United Kingdom . |
| WO88/01417 | 2/1988 | WIPO . |
| 91/01406 | 11/1991 | WIPO . |

Primary Examiner—John K. Peng
Assistant Examiner—Daniel J. Wu
Attorney, Agent, or Firm—Westman, Champlin & Kelly

[57] ABSTRACT

A transmitter (1) is connected to a source of DC voltage via supply wires (55) and to a sensor (53) having definable characteristics for electrical measurement of a physical variable, the transmitter having a housing (3) having terminals (18) for connection to the supply wires and containing transmitter circuitry (14, 27, 29) operable to modulate current in the supply wires to thereby transmit a signal representative of the sensed value of the physical variable; the transmitter circuitry including a microprocessor (27) and a memory for containing data defining a transfer characteristic to be operated by the microprocessor so that the signal is representative of the sensed value or of a predetermined function of the sensed value for said characteristics of the sensor; the transmitter further including an inductive loop for receiving signals relating to said data defining the transfer characteristic from an electronic programming device (20) and circuitry to load said data into the memory in response to the signals received. The transmitter is insensitive to interference from electromagnetic radiation and spurious voltages induced on the supply wires.

12 Claims, 7 Drawing Sheets

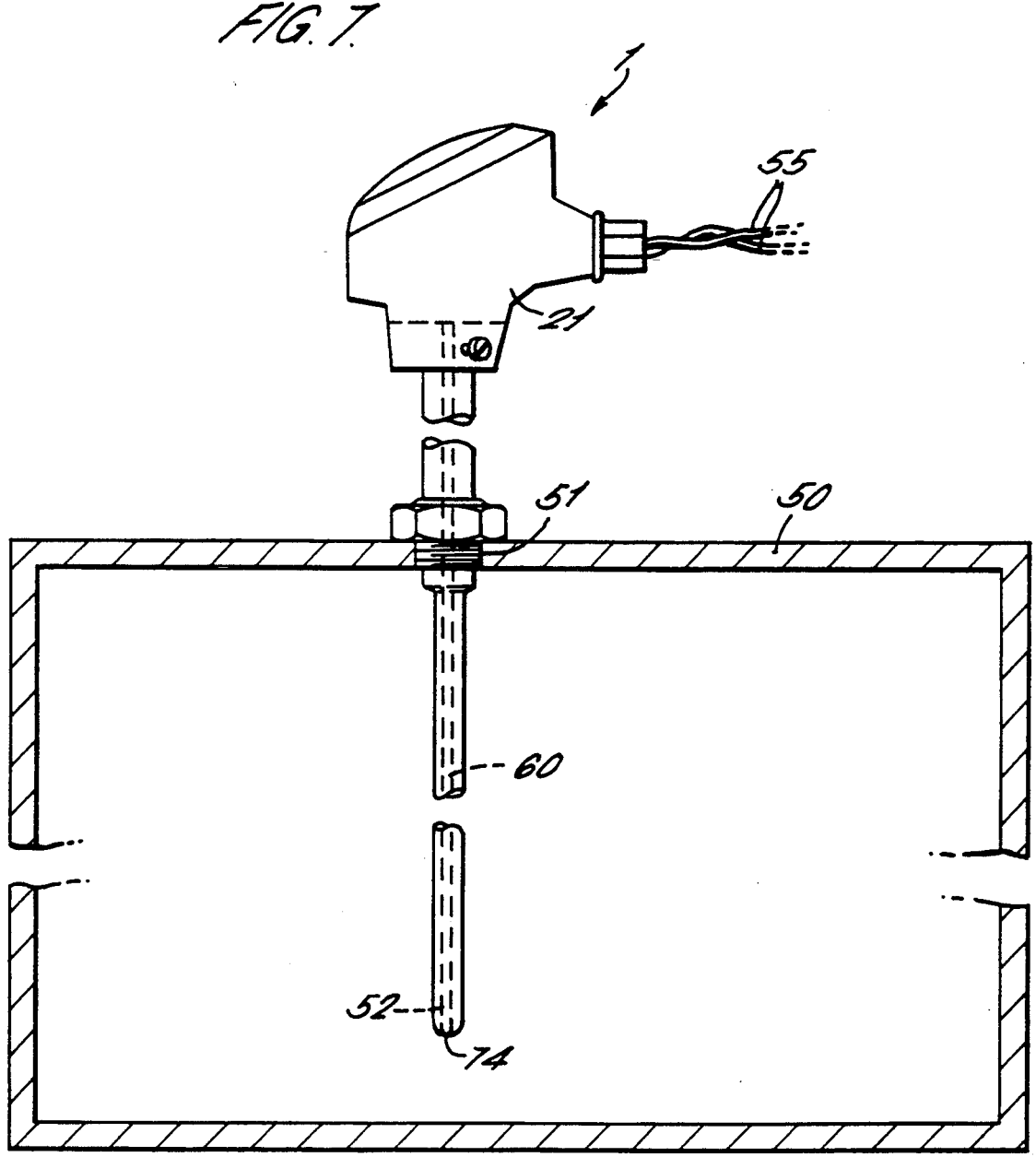

MICROPROCESSOR CONTROLLED TRANSMITTER FOR CONNECTION TO A SENSOR AND A METHOD OF TRANSFERRING DIGITAL SIGNALS TO THE MICROPROCESSOR

SUMMARY OF THE INVENTION

This invention relates to a transmitter and in particular but not exclusively to a temperature transmitter for use with a thermocouple temperature sensor.

It is known to provide "two wire" current transmitters for remote monitoring of physical variables such as temperature or pressure, the transmitters typically being located close to a sensor and connected by two wires to a DC voltage source located at a remote monitoring station such conventional transmitters have the advantage of requiring only two wires to connect them to the remote monitoring station and include current modulating circuitry to transmit a signal along the wires representative of the sensed variable.

"Smart" transmitters are also known which include a microprocessor which can be programmed to adapt the dynamic range of the transmitted signal to suit a required measurement range of the variable and to include calibration data for the selected sensor.

Such smart transmitters have hitherto been interactively programmable by means of an interface unit connected to the wires intermediate the transmitter and the remote monitoring station or located at the station itself, communication with the transmitter being by signals conducted by the wires.

According to the present invention there is disclosed a transmitter for connection to a source of DC voltage via supply wires and to a sensor having definable characteristics for electrical measurement of a physical variable, the transmitter having a housing having terminals for connection to the supply wires and containing transmitter circuitry operable to modulate current in the supply wires to thereby transmit a signal representative of the sensed value of the physical variable; the transmitter circuitry including a microprocessor and a memory for containing data defining a transfer characteristic to be operated by the microprocessor so that the signal is representative of the sensed value or of a predetermined function of the sensed value for said characteristics of the sensor; the transmitter further including a communication means for receiving signals relating to said data defining the transfer characteristic from an electronic programming device, and means to load said data into the memory in response to the signals received by the communication means wherein the communication means comprises an inductive loop.

An advantage of such an arrangement is that it is not necessary for signals for the input of data to the microprocessor to be received through externally mounted electrical terminals on the transmitter so that such terminals can therefore be made less susceptible to radio frequency interference and the input of spurious signals. The number of terminals required on the transmitter can also be minimised.

In a preferred embodiment the external shape of a temperature transmitter corresponds to the dimensions of conventional transmitters so as to be compatible with existing fittings and to conform to established standards.

Advantageously the loop is a coil mounted in the housing of the instrument so as to define an aperture into which a finger of the programming device can be inserted to send signals to the communication means.

The housing may include a metal member having an aperture and the coil may then be mounted behind the periphery of the aperture. The presence of the metal member makes the coil very insensitive to stray fields since the metal member is effectively a shorted coil. This is important where the transmitter is to be used in the presence of stray electromagnetic fields which might otherwise result in corruption of the stored data or could interfere with the operation of the circuitry.

Preferably the housing includes further terminals for connection to sensor wires connected to or forming the sensor, which wires are received in the aperture in the metal member when so connected, the relative dimensions of the aperture and the finger being such that the finger cannot be inserted in the aperture when the sensor wires are so received. The presence of the wires prevents the insertion of the finger so that further operation of the programming device is prevented so long as the transmitter remains in situ and connected to the sensor. This is useful in preserving the integrity of the transmitter against tampering.

Conveniently the finger of the programming device contains a ferromagnetic core with a coil wound on the core so as to provide inductive coupling between the coil on the core and the coil in the housing when the finger is inserted into the aperture.

Preferably the communication means is also operable to transmit signals to the electronic programming device representative of the data stored in the memory. It is therefore possible to check that the data has been correctly entered and to interrogate the transmitter to determine the manner in which it has been programmed.

Conveniently the memory is an electrically erasable programmable read-only memory (EEPROM). Such a memory has the advantage of being non-volatile in that data in the memory is not lost when power to the transmitter is turned off.

In a preferred embodiment of the invention the sensor is a temperature sensor in the form of a thermocouple. The sensor may alternatively be a resistance thermometer or a pressure sensor.

According to a further aspect of the present invention there is disclosed a method of transferring digital signals between a programing device and a microprocessor controlled apparatus by means of an inductive link comprising first and second coils of the apparatus and programming device respectively, the method comprising the steps of bringing the first and second coils together to a position in which they are inductively coupled, inputting a digital signal to one of the coils, detecting at the output of the other coil impulses corresponding to rising and falling edges of the digital signal and inputting the impulses to a bi-stable flip/flop device so as to reconstruct the digital signal.

Preferably in said method, the apparatus comprises a first circuit connected to the first coil, the first circuit being switchable between a receiving mode in which the first circuit is operable to reconstruct a digital signal received from the programming device and a transmitting mode in which the first circuit is operable to input a digital signal to the first coil for transmission to the programming device.

Conveniently the programming device comprises a second circuit connected to the second coil, the second circuit being switchable between a receiving mode in which the second circuit is operable to reconstruct a digital signal received from the apparatus and a transmitting mode in which the second circuit is operable to input a digital signal to the second coil for transmission to the apparatus.

The apparatus may be a transmitter connectable to a sensor having definable characteristics for measurement of a physical variable, the method comprising the steps of transferring a digital signal from the programming device to the transmitter in a receiving mode of the first circuit, the digital signal being representative of data defining a transfer characteristic to be operated by the microprocessor in processing sensor signals received from the sensor, inputting the data into the microprocessor and processing the sensor signals to produce an output signal representative of the sensed value of the physical variable or of a predetermined function of the sensed variable.

Preferably in such a method, data contained in a digital signal received by the apparatus is stored in a memory associated with the microprocessor and the signal further includes an instruction in response to which the first circuit is switched to transmitting mode, the method including the further step of transmitting to the programming device a signal representative of stored data.

The first coil may be mounted in a housing of the apparatus so as to define an aperture into which a finger of the programming device is insertable, the finger comprising the second coil whereby the method includes the step of bringing together the first and second coils to a position in which they are inductively coupled by insertion of the finger into the aperture.

BRIEF DESCRIPTION OF THE DRAWINGS

An embodiment of the present invention will now be described by way of example only and with reference to the accompanying drawings of which:

FIG. 7 is a partly sectioned view showing a thermowell fitted with the temperature transmitter of FIGS. 1 to 6.

DESCRIPTION OF THE PREFERRED EMBODIMENTS

Figure 1:
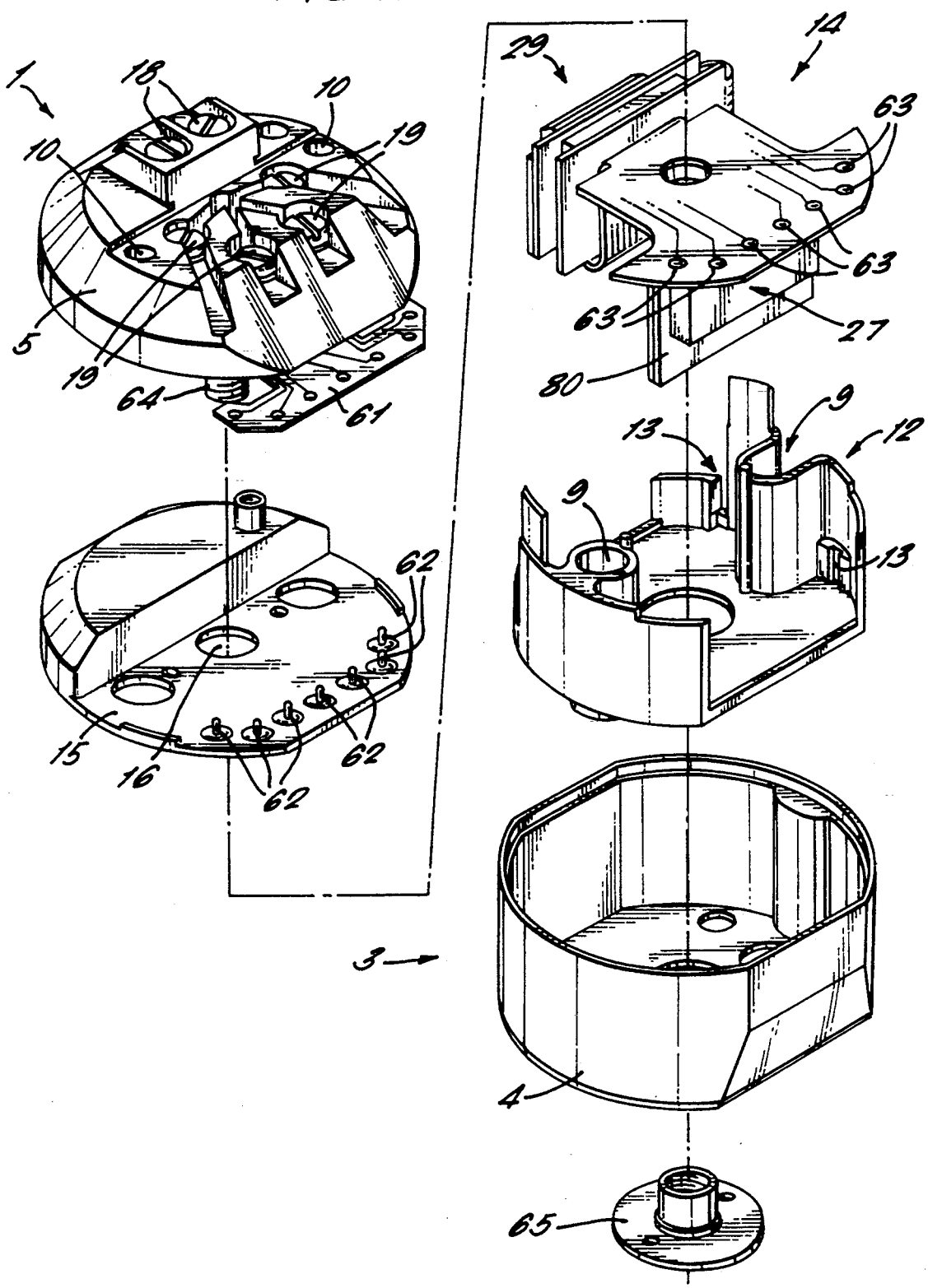
FIG. 1 is an exploded view of a transmitter for use in temperature measurement in accordance with the present invention.

In FIG. 1 a transmitter 1 is shown in exploded view and includes a housing 3 comprising an open-topped zinc diecast body 4 with a closure in the form of a zinc plate 15 overlaid by a lid 5 formed of a plastics material.

Figure 5:
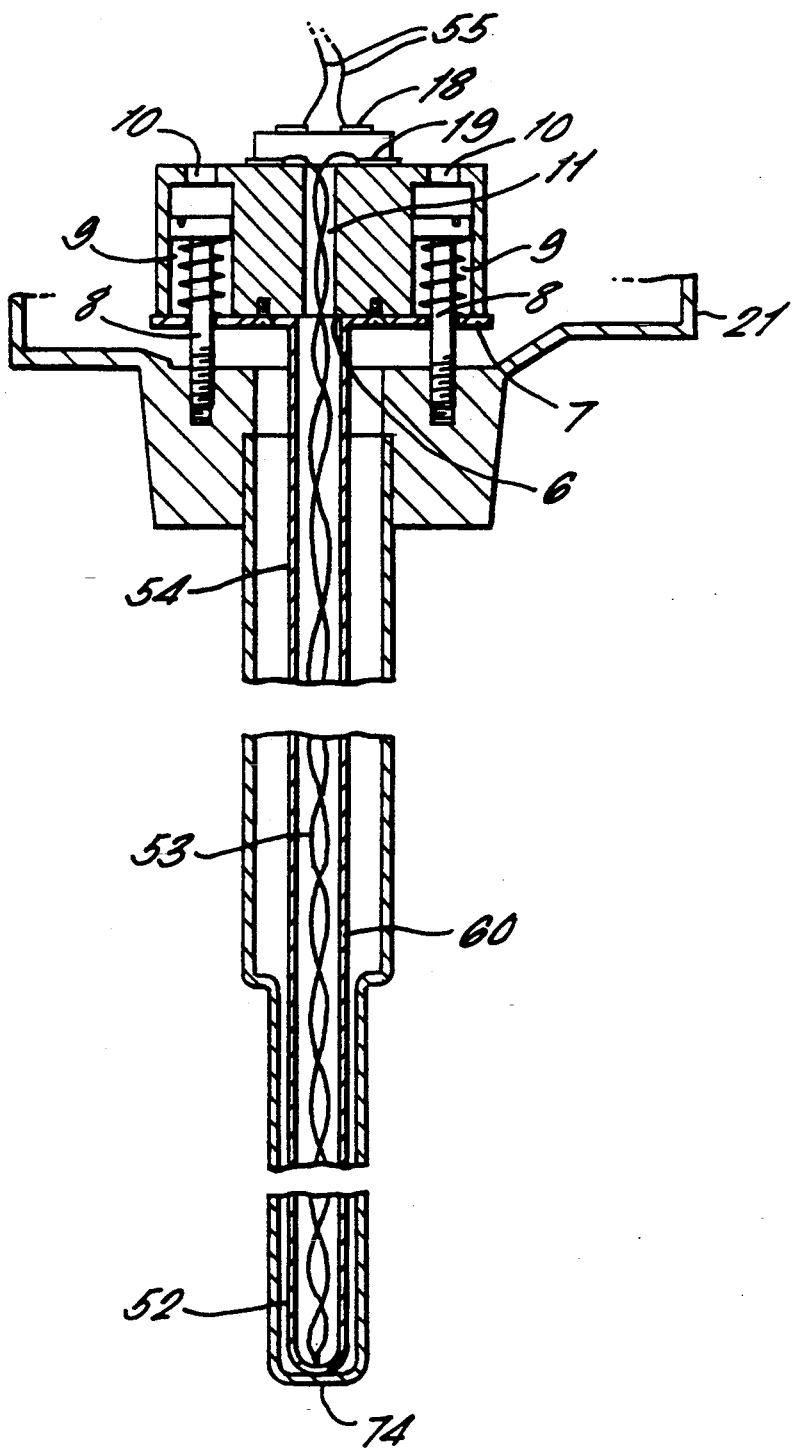
FIG. 5 is schematic sectional view of the transmitter in use.

The housing 3 is generally cylindrical in shape and in use is mounted with a base 6 of the housing held in contact with a mounting plate 7 as shown in FIG. 5. The mounting plate 7 supports a tubular sheath 60 in which a pair of thermocouple wires 53 constituting a temperature sensor are received.

The lid 5 is provided with screw holes 10 which are diametrically opposite one another and between these screw holes the lid is provided with a central aperture 11 which extends through the body 4 and the base 6.

The transmitter is mounted in the thermowell by means of the spring loaded screws 8 which are received in the channels 9. By adjusting the screws 8 via screw holes 10 the transmitter is biassed into contact with the thermowell 21 such that good thermal contact is made between the distal end 52 of the sheath and a tip 74 of the thermowell at which temperature is to be sensed.

When the body 4 is connected to the mounting plate 7 as shown in FIG. 5 the central aperture 11 communicates with the sheath 60 so that the thermocouple 53 wires extend through the aperture. An insert 12 moulded from a plastics material is located within the body 4 as shown in FIG. 1 and defines supports 13 for a circuit-board 14 and channels 9 receiving spring loaded mounting screws 8. A microprocessor 27 and an electrically erasable programmable read-only memory (EEPROM) 29 are mounted on the circuit-board 14 together with transmitter circuitry 80. The zinc plate 15 is horizontally located so as to extend parallel to and in close proximity with the lid 5 and defines a central aperture 16 aligned with the aperture 11 formed in the lid. A first coil 17 of one hundred turns is mounted on the circuit board 14 such that when assembled the coil 17 is in close proximity with the plate 15 and surrounds the aperture 16, the separation between the lid and the coil being one millimeter.

When assembled the body 4 and the plate 15 enclose the circuit board 14 to thereby provide electromagnetic screening. Two power supply terminals 18 are mounted on the lid 5 together with four sensor terminals 19. The terminals 18 and 19 are connected to a flexible circuit board 61 located beneath the lid 5 and which connects the terminals, when assembled, with respective pin terminals 62 which comprise the terminals of filter capacitors integrally mounted with the plate 15. The pin terminals 62 are connected when assembled with respective contacts 63 of the circuit board 14.

The lid 5 includes a tubular screw threaded projection 64 defining the central aperture 11 and extending through the body 4 and receiving a threaded cap 65. During assembly the insert 12 and circuit board 14 are received within the body 4 and the body closed by addition of the plate 15. The lid 5 is then added and secured by means of the cap 65 which holds together the above components of the transmitter 1. A suitable potting compound is then injected into the body 4 which protects the internal components against vibration and humidity effects.

Figure 2:
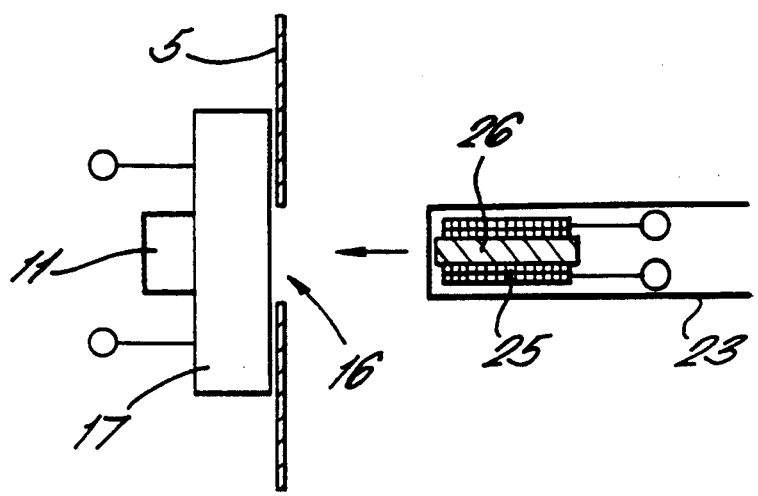
FIG. 2 is a schematic partly sectioned view of the transmitter and a finger of a programming device.
Figure 6:
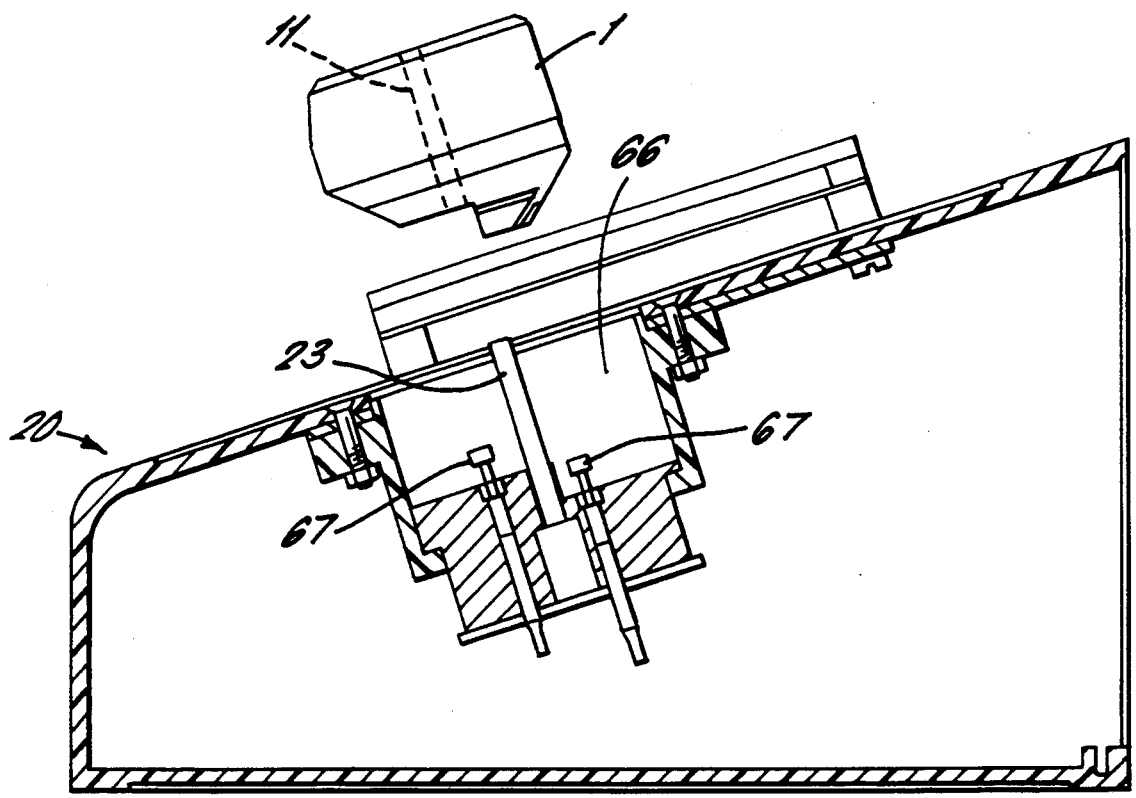
FIG. 6 is a partly sectioned view of the programming device and the transmitter.

A programming device 20 is shown in FIG. 6 and includes a cylindrical projection or finger 23 which is also shown schematically in FIG. 2. The finger 23 projects coaxially within a cylindrical recess 66 in the programming device 20 and the transmitter 1 is insertable in the recess such that the finger 23 is a sliding fit in the aperture 11.

Spring loaded contacts 67 are mounted in the recess 66 so as to make contact with the terminals 18 and 19 of the transmitter 1.

As illustrated schematically in FIG. 2 the finger 23 houses a second coil 25 of one hundred turns and is oriented such that a ferrite core 26 extends axially through the second coil in axial alignment with the first coil 17 when the finger is inserted into the aperture 11.

In FIGS. 5 and 7 the transmitter 1 together with the sheath 60 is shown mounted in a protective casing or thermowell 21 coupled to a tank 50 of a process whose temperature is to be monitored. The tank 50 has a bore 51 receiving the thermowell 21 such that the transmitter 1 is outside of the tank 50 and the sheath 60 projects into the interior of the tank. The thermocouple wires 53 extend from a proximate end 54 to a distal end 52 of the sheath 60 where the wires are joined to constitute the hot junction of a thermocouple sensor. The wires 53 are connected to the input terminals 19 of the transmitter 1 which constitutes the cold junction of the thermocouple. The transmitter 1 includes a cold junction compensating sensor (not shown) for sensing the temperature at the cold junction.

The transmitter 1 is powered via power supply lines 55 which also serve as a data transmission line for sending temperature measurement data, the current drawn by the transmitter being modulated between 4 and 20 milliamps by operation of the transmitter circuitry 80 and this modulation being decoded at the power supply (not shown).

Figure 3:
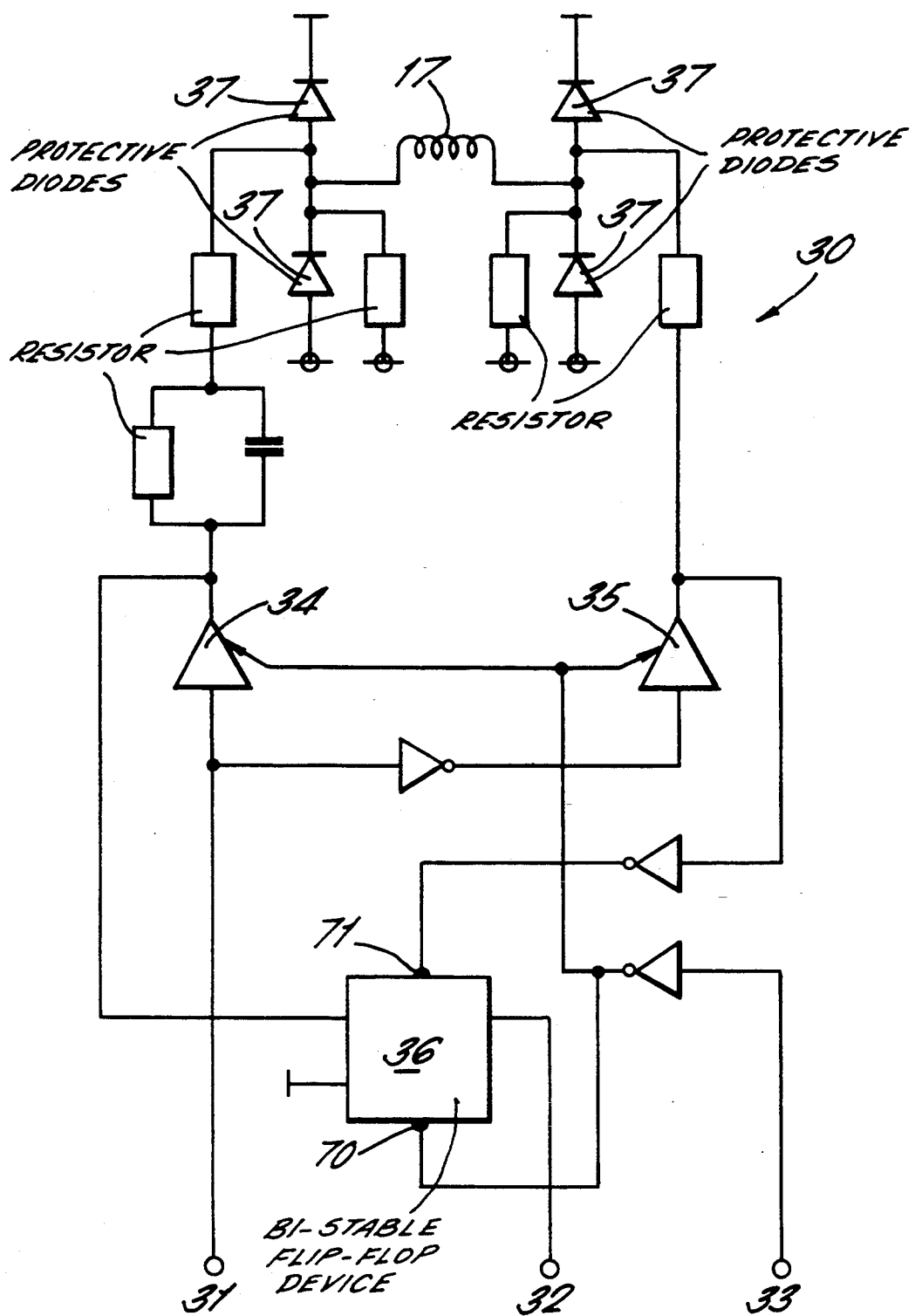
FIG. 3 is a circuit diagram of part of the transmitter associated with the coil of the transmitter.

The transmitter 1 includes a first circuit 30 connected to the first coil 17 as shown in FIG. 3. The first circuit 30 enables the coil 17 to be used either to receive or transmit data characterising the transfer characteristics of the transmitter via the second coil 25 when the programming device 20 is coupled to the transmitter 1. Data to be transmitted when in transmitting mode is input to the first circuit via terminal 31 and received signals are output when in receiving mode via terminal 32. The receive/transmit status of the first circuit 30 is determined by a "direction" signal input via a terminal 33.

The direction signal terminal 33 is connected to tri-state driver chips 34 and 35, the logical state of the direction signal being arranged to enable or disable the chips 34 and 35 to select transmitting or receiving operation respectively.

When operating in receiving mode the output signal at terminal 32 is provided by a bi-stable flip/flop device 36 having inverted SET and RESET terminals 70 and 71 respectively, the first circuit therefore being adapted to receive serially encoded binary signals of variable mark/space wave form.

The first circuit 30 also includes protective diodes 37 arranged to limit the voltage output of the first coil 17.

Figure 4:
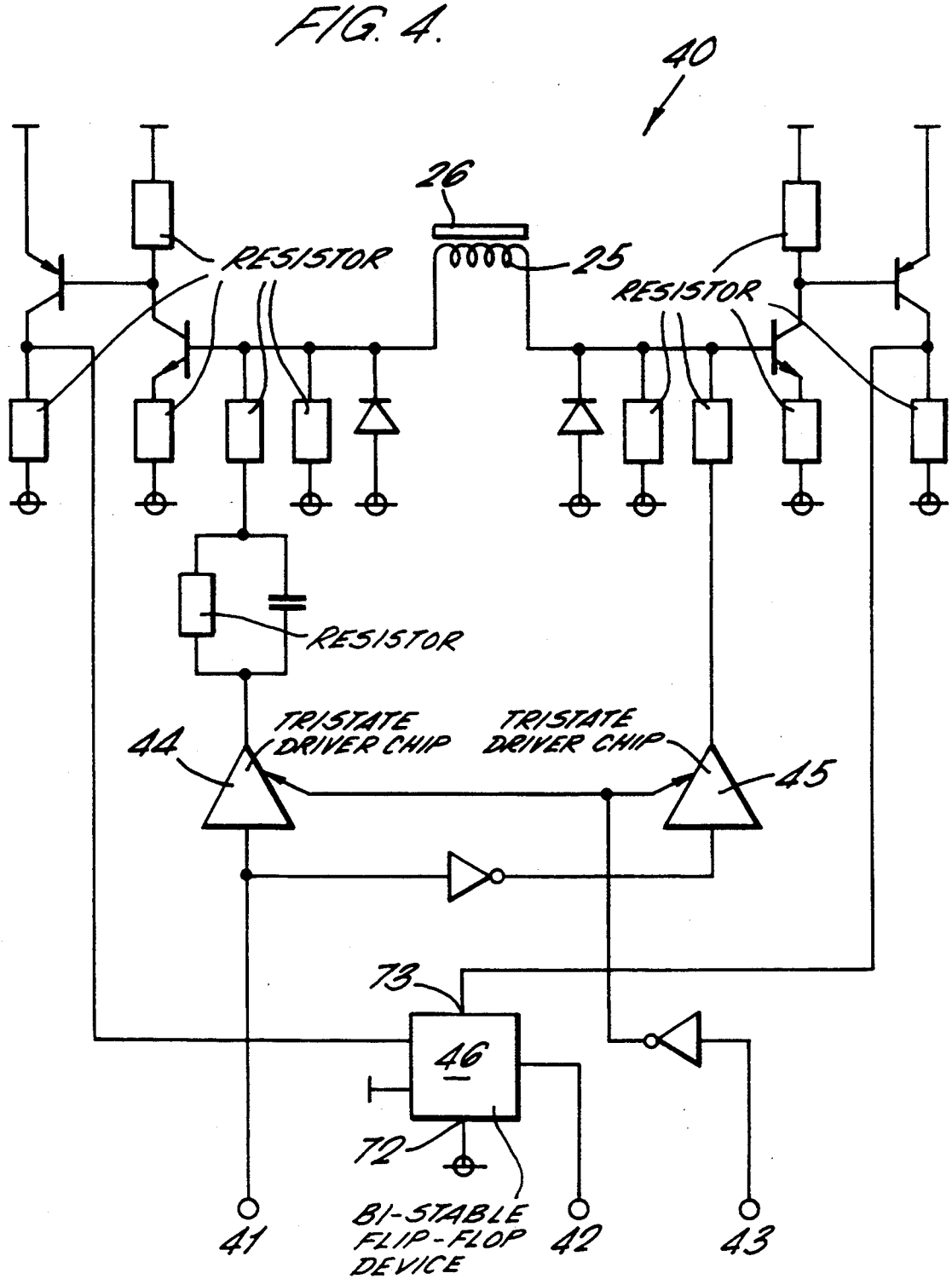
FIG. 4 is a circuit diagram of the programming device.

The programming device 20 similarly includes a second circuit 40 connected to the second coil 25 as shown in FIG. 4. The second circuit 40 includes an input terminal 41 for receiving signals when in transmitting mode and has an output terminal 42 for the output of received signals when in receiving mode of operation. A terminal 43 is provided for receiving "direction" signal instructions to switch the second circuit 40 between receiving and transmitting modes.

The direction signal terminal 43 is connected to tri-state driver chips 44 and 45, the logical state of the direction signal being arranged to enable or disable the chips 34 and 35 to select transmitting or receiving operation respectively.

The tristate driver chips 44 and 45 connect the input terminal 41 with the second coil 25 to allow serially encoded binary signals of variable mark space wave form to be transmitted via the second coil 25 and to be received by the first coil 17 when the programming device 20 is coupled to the transmitter 1.

Such signals are received by inductive coupling in the first circuit 30 as impulses of alternating polarity which are reconstituted by the flip/flop device 36 as a binary signal having the same mark/space waveform as the original signal input to terminal 41.

Such signals are used to input data into the memory 29 of the transmitter 1, the data providing the microprocessor 27 with the relevant transfer characteristics and other operating data required for use with the specific sensor 53 to be connected to the instrument.

The contents of the memory 29 can also be read by the programming device 20 by instructing the first circuit 30 to select transmitting mode by providing the appropriate signal o the direction signal terminal 33. At the same time the second circuit 40 of the programming device 20 is switched to receiving mode by an appropriate signal at the direction signal terminal 43.

In this mode of operation serially encoded binary signals input to the transmit terminal 31 of the first circuit 30 are connected to the first coil 17 via the tri-state driver chips 34 and 35. By inductive coupling these signals are received via the second coil 25 and appear as impulses of alternating polarity which are reconstituted as binary signals in a bi-stable flip/flop device 46 having non-inverted SET and RESET terminals 72 and 73 respectively which provides an output signal to terminal 42.

In use a suitable sensor is selected for measuring the temperature of the article 50, the sensor in the present example being the pair of thermocouple wires 53, and the range of temperature to be measured is identified. The characteristics of the sensor are determined and suitable data is generated in the programming device 20 ready for downloading to the memory 29 of the transmitter 1. The transmitter 1, without having any wires connected to terminals 18 or 19, is made ready by insertion into the recess 66 and receives power via contacts 67. In this position the finger 23 extends through the aperture 11.

In this position the ferrite core 26 provides coupling between the first and second coils 17 and 25 respectively. The first circuit 30 of the transmitter 1 is in its normal receiving mode of operation which is automatically adopted on start-up. The second circuit 40 is made ready in transmitting mode by inputting a direction signal to terminal 43 and the transmission of data from he programming device 2 to the transmitter then proceeds.

Confirmation that the data has been received and stored correctly is achieved by communication in the reverse direction in which the first circuit 30 is switched to transmitting mode and the second circuit 40 is switched to receiving mode.

Once the transmitter 1 has been suitably programmed with the required data it is uncoupled from the programming device 20 and the transmitter is then connected to the mounting plate 7 as shown in FIG. 5. The thermocouple wires 53 are positioned in the sheath 60 such that the hot junction is at the distal end 52 and are fed through the aperture 11 to be connected to terminals 19. Once assembled in this manner it is no longer possible to couple the programming device 20 to the transmitter 1 since the presence of the thermocouple wires 53 in the aperture 11 prevents insertion of the finger 23.

The transmitter 1 may alternatively include an application specific integrated circuit to replace discrete components of the first circuit 30.

Transmitters in accordance with the present invention may be used with other types of temperature sensor such as resistance thermometers. Alternatively, sensors of other physical variables such as pressure may be used and, in particular, a capacitive pressure sensor may be used.

The transfer characteristic to be operated by the microprocessor will generally be such as will produce a transmitted signal which is representative of the sensed value of the physical variable. For example, a signal which is proportional to a sensed temperature will be produced by choice of a transfer characteristic which takes account of the non-linearity of the sensor. In some applications however the transfer characteristic may be selected to provide a signal which is representative of a predetermined function of the sensed value. For example, it may be desirable to produce a signal which is representative of the square root of a sensed differential pressure and in this instance the transfer characteristic can take account not only of the non-linear characteristics of a differential pressure sensor but can incorporate the required square root function of the sensed value.

The housing is described as having terminals which in the preferred embodiment are screw fittings on the exterior of the housing. Other terminals may be alternatively provided such as soldered terminals which may be located within the housing and having connecting wires which are permanently attached.

I claim:

1. A transmitter for connection to a source of DC voltage via supply wires and to a sensor having predetermined characteristics for electrical measurement of a physical variable, the transmitter having a housing with terminals for connection to the supply wires and containing transmitter circuitry for modulating current in the supply wires to thereby transmit a signal representative of a sensed value of the physical variable; the transmitter circuitry including a microprocessor and a memory for containing data defining a transfer characteristic to be operated by the microprocessor so that the signal is representative of a predetermined function of the sensed value for said characteristics of the sensor; the transmitter further including a communication means for receiving signals relating to said data defining the transfer characteristic from an electronic programming device and means to load said data into the memory in response to signals received by the communication means, wherein the communication means comprises an inductive loop comprising a coil mounted in the housing, said housing defining an aperture extending through said coil and into which a finger of the programming device can be inserted, said finger comprising a second coil connected to said programming device and being inductively coupled to said coil when said finger is inserted to send said signals to the communication means.

2. A transmitter as claimed in claim 1 wherein the housing includes a metal member having an aperture and the coil is mounted behind a periphery of said aperture.

3. A transmitter as claimed in claim 2 wherein the housing includes further terminals for connection to sensor wires connected to or forming the sensor, which wires are received in the aperture in the metal member when so connected, the relative dimensions of the finger and the aperture being such that the finger cannot be inserted in the aperture when the sensor wires are so received.

4. A transmitter as claimed in claim 1, in combination with said programming device having said finger, wherein the finger contains a ferromagnetic core with said second coil wound on the core so as to provide inductive coupling between said second coil on the core and the coil in said housing when the finger is inserted into said aperture.

5. A transmitter as claimed in claim 1 wherein the communication means includes means for transmitting signals to the electronic programming device representative of the data stored in the memory.

6. A transmitter as claimed in claim 1 wherein the memory is an electrically erasable programmable read-only memory.

7. A transmitter as claimed in claim 1 wherein the sensor is a temperature sensor.

8. A method of transferring digital signals between a programming device and a microprocessor controlled apparatus by means of an inductive link comprising first and second coils of the apparatus and programming device respectively, the method comprising the steps of bringing the first and second coils together to a position in which they are inductively coupled, inputting a digital signal to one of the coils, detecting at an output of the other coil impulses corresponding to rising and falling edges of the digital signal and inputting the impulses to a bi-stable flip/flop device so as to reconstruct the digital signal, the method including the step at inserting a finer comprising the second coil into an aperture defined by a housing within which the first coil is mounted thereby bringing together the first and second coils to a position in which they are inductively coupled by insertion of the finger into the aperture.

9. A method as claimed in claim 8 comprising the steps of switching a first circuit of said apparatus connected to the first coil between a receiving mode in which the first circuit reconstructs a digital signal received from the programming device and a transmitting mode in which the first circuit inputs a digital signal to the first coil for transmission to the programming device.

10. A method as claimed in claim 8 comprising the steps of switching a second circuit of the programming device connected to the second coil between a receiving mode in which the second circuit reconstructs a digital signal received from the apparatus and a transmitting mode in which the second circuit inputs a digital signal to the second coil for transmission to the apparatus.

11. A method as claimed in claim 9 comprising the steps of transferring a digital signal from the programming device to the apparatus in a receiving mode of the first circuit, the digital signal being representative of data defining a transfer characteristic to be operated by the microprocessor in processing sensor signals received from a sensor subsequently connected to the apparatus and having definable characteristics for measurement of a physical variable, inputting the data into the microprocessor and processing the sensor signals to produce an output signal representative of the predetermined function of the sensed variable.

12. A method as claimed in claim 9 in which data contained in a digital signal received by the apparatus is stored in a memory associated with the microprocessor and the signal further includes an instruction in response to which the first circuit is switched to transmitting mode, the method including the further step of transmitting to the programming device a signal representative of stored data.

* * * * *

UNITED STATES PATENT AND TRADEMARK OFFICE
CERTIFICATE OF CORRECTION

PATENT NO. : 5,451,939
DATED : September 19, 1995
INVENTOR(S) : Timothy D. Price It is certified that error appears in the above-indentified patent and that said Letters Patent is hereby corrected as shown below:

```
Col. 8, line 28, please change "finer" to
--finger--.
```

Signed and Sealed this

Ninth Day of January, 1996

Attest:

BRUCE LEHMAN

Attesting Officer        Commissioner of Patents and Trademarks